US010008300B2

(12) United States Patent
Hanada et al.

(10) Patent No.: US 10,008,300 B2
(45) Date of Patent: Jun. 26, 2018

(54) METHOD FOR ELIMINATING RADIOACTIVE IODINE AND HYDROPHILIC RESIN FOR ELIMINATING RADIOACTIVE IODINE

(71) Applicants: Dainichiseika Color & Chemicals Mfg. Co., Ltd., Tokyo (JP); Ukima Chemicals & Color Mfg. Co., Ltd., Tokyo (JP)

(72) Inventors: Kazuyuki Hanada, Tokyo (JP); Manabu Uruno, Tokyo (JP); Kazuya Kimura, Tokyo (JP); Kenichi Takahashi, Tokyo (JP)

(73) Assignees: Dainichiseika Color & Chemicals Mfg. Co. Ltd., Tokyo (JP); Ukima Chemicals & Color Mfg. Co., Ltd., Tokyo (JP)

( * ) Notice: Subject to any disclaimer, the term of this patent is extended or adjusted under 35 U.S.C. 154(b) by 1338 days.

(21) Appl. No.: 14/205,450

(22) Filed: Mar. 12, 2014

(65) Prior Publication Data

US 2018/0151264 A1 May 31, 2018

Related U.S. Application Data

(63) Continuation of application No. PCT/JP2012/077595, filed on Oct. 25, 2012.

(30) Foreign Application Priority Data

Oct. 26, 2011 (JP) ................................ 2011-234739
Mar. 2, 2012 (JP) ................................ 2012-046846

(51) Int. Cl.
*G21F 9/12* (2006.01)
*G21F 9/28* (2006.01)
(Continued)

(52) U.S. Cl.
CPC ................ *G21F 9/12* (2013.01); *C02F 1/285* (2013.01); *G21F 9/307* (2013.01); *C02F 2101/006* (2013.01); *C02F 2101/12* (2013.01)

(58) Field of Classification Search
CPC .. G21F 9/12; G21F 9/307; C02F 1/285; C02F 1/42; C02F 2001/422; C02F 2101/006; C02F 2101/12; B01J 20/264
See application file for complete search history.

(56) References Cited

U.S. PATENT DOCUMENTS 3,223,619 A * 12/1965 Calmon .................. C02F 1/002
210/282

FOREIGN PATENT DOCUMENTS

EP 0 360 276 A2 3/1990
JP 62-044239 B2 9/1987
(Continued)

OTHER PUBLICATIONS

Palagyi et al, Open-cell Foam as a Sorbent in the Extraction of Iodine-131, Dec. 1981, Analyst, vol. 106, pp. 1326-1333.*
(Continued)

*Primary Examiner* — Matthew O Savage
(74) *Attorney, Agent, or Firm* — Burr & Brown, PLLC

(57) ABSTRACT

The present invention is a method for eliminating radioactive iodine using a hydrophilic resin that adsorbs radioactive iodine, wherein the hydrophilic resin is at least one selected from the group consisting of a hydrophilic polyurethane resin, a hydrophilic polyurea resin, and a hydrophilic polyurethane-polyurea resin and has a hydrophilic segment and, in the principal chain and/or a side chain in the structure thereof, has a tertiary amino group or has a tertiary amino group and polysiloxane segment. By means of the present invention, a novel method for eliminating radioactive iodine is provided that is simple and low-cost, furthermore does not
(Continued)

require an energy source such as electricity, moreover can take in and stably immobilize the eliminated radioactive iodine within a solid, and is capable of reducing the volume of radioactive waste as necessary.

10 Claims, 2 Drawing Sheets

(51) Int. Cl.

| | |
|---|---|
| ***C02F 1/28*** | (2006.01) |
| ***G21F 9/30*** | (2006.01) |
| *C02F 101/12* | (2006.01) |
| *C02F 101/00* | (2006.01) |

(56) References Cited

FOREIGN PATENT DOCUMENTS

| | | | |
|---|---|---|---|
| JP | 62-237398 | A1 | 10/1987 |
| JP | 2000-309609 | A1 | 11/2000 |
| JP | 2002-350588 | A1 | 12/2002 |
| JP | 2004-244641 | A1 | 9/2004 |
| JP | 2005-037133 | A1 | 2/2005 |
| JP | 2008-116280 | A1 | 5/2008 |

OTHER PUBLICATIONS

Bowen, Absorptin by Polyurethane Foams; New Method of Separation, Jan. 1970, J. Chem. Soc.(A), 1970, pp. 1082-1885.*

* cited by examiner

[Figure 1]
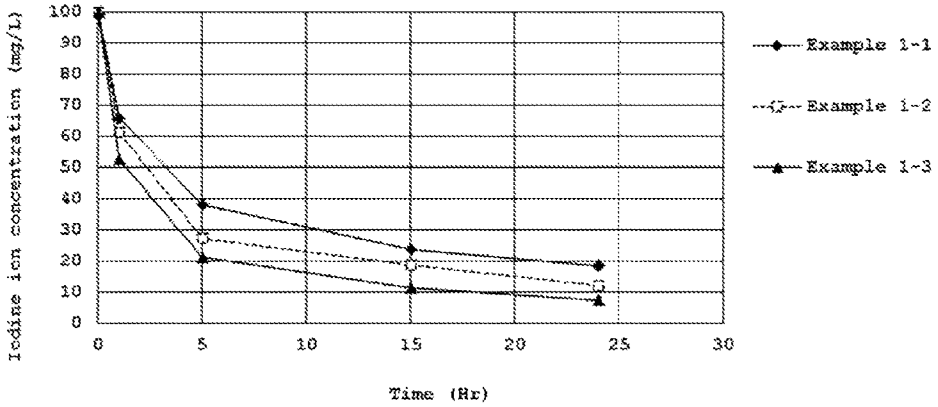
[Figure 2]
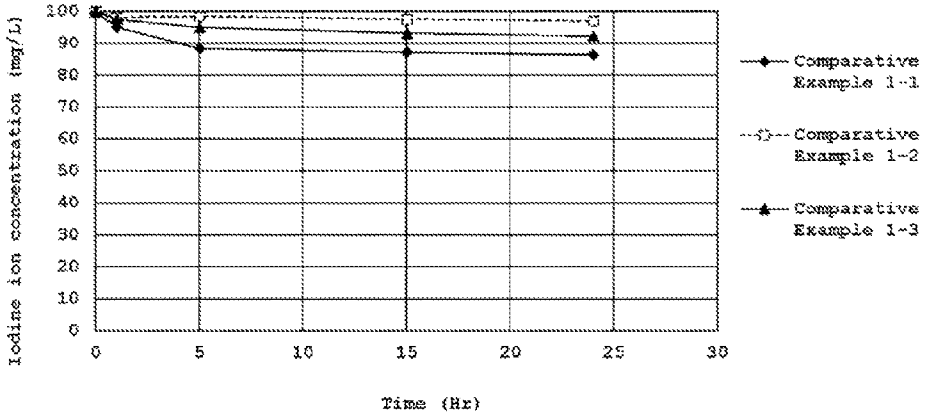

[Figure 3]
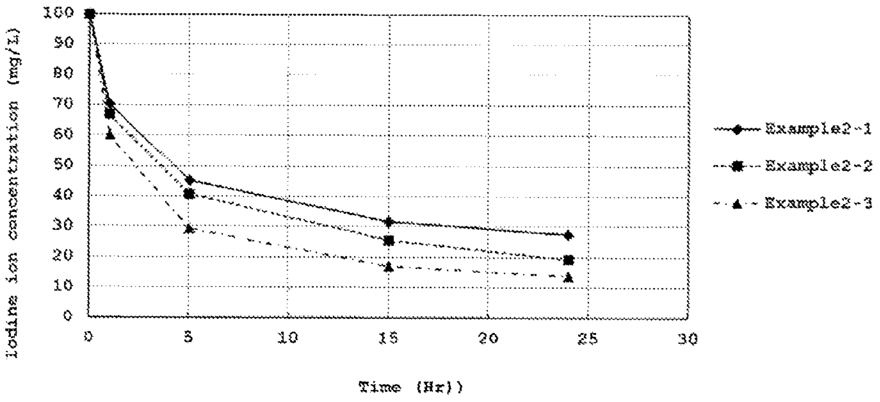
[Figure 4]
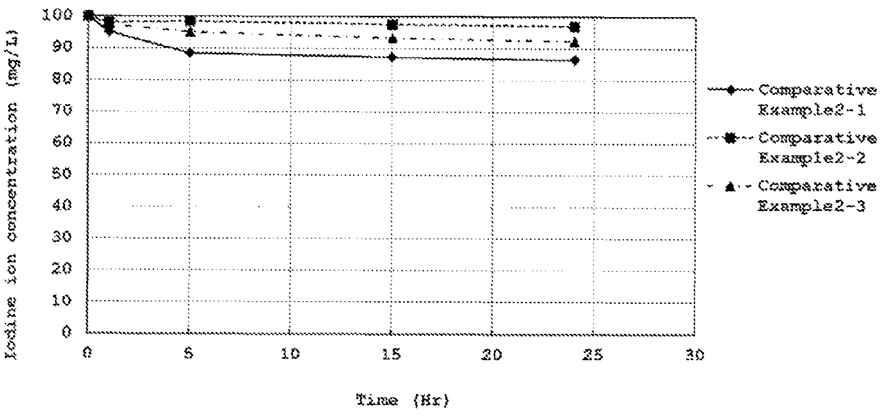

METHOD FOR ELIMINATING RADIOACTIVE IODINE AND HYDROPHILIC RESIN FOR ELIMINATING RADIOACTIVE IODINE

TECHNICAL FIELD

The present invention relates to a method for eliminating radioactive iodine present in liquid and/or a solid body generated from a nuclear power plant or a reprocessing facility of spent nuclear fuel and to a hydrophilic resin that is suitable for the method and has a function of immobilizing radioactive iodine.

BACKGROUND ART

In currently widespread nuclear reactor power plants, nuclear fission in a nuclear reactor is accompanied by generation of a considerable amount of radioactive by-products, and since radioactive iodine above all turns into a gas at 184° C., there is a risk that the radioactive iodine is extremely liable to be discharged at the time of inspection or exchange of fuel and furthermore by an unforeseen event such as an accident during handling fuel or a reactor excursion accident. The major radioactive iodine isotopes to be taken into account at the time of discharge are iodine 129 having a long half-life (half-life: $1.57\times10^7$ years) and iodine 131 having a short half-life (half-life: 8.05 days). Here, ordinary iodine is an essential trace element in the human body, is collected in the thyroid gland near the throat, and becomes a component of a growth hormone. Therefore, when a human takes in radioactive iodine through breathing or water/foods, the radioactive iodine is collected in the thyroid gland in the same way as in the case of ordinary iodine and increases internal exposure to radioactivity. Accordingly, a particularly strict measure for reducing the amount of radioactivity to be discharged must be implemented with regard to radioactive iodine.

To such a situation, a cleaning processing system, a physical/chemical processing system by a solid adsorbent filling using fibrous activated carbon or the like (see Patent Literatures 1 and 2), a processing by an ion exchange material (see Patent Literature 3), and so on have been studied as a method for processing radioactive iodine generated in a nuclear reactor or the like. And these methods have been utilized in countermeasures against discharge of generated radioactive iodine.

However, any of the above methods have problems as described below, and the development of a method for eliminating radioactive iodine in which these problems are solved is desired. An alkaline cleaning method exists as a cleaning processing system practically used, however there are lots of problems in terms of quantity and safety to carry out processing by the cleaning processing system with a liquid adsorbent and store the processed liquid as it is for a long period of time. In the physical/chemical processing system by a solid adsorbent filling, captured radioactive iodine is always facing the possibility of being replaced with other gases, and in addition to this problem, the processing system has a problem that an adsorbed material is liable to be discharged when the temperature increases. Furthermore, in the processing system by an ion exchange material, the heat resistant temperature of the ion exchange material is up to about 100° C. and there is a problem that the ion exchange material cannot exhibit sufficient performance at a temperature higher than the heat resistant temperature.

Furthermore, in any of the above-described processing methods, large scale facilities such as a circulation pump, a cleaning tank, and furthermore a filling tank containing various adsorbents are necessary, and in addition, there is a practical problem that a large amount of energy is needed to operate these facilities. Moreover, when supply of the power source is suspended as in the accident at the Fukushima No. 1 nuclear power plant in Japan on Mar. 11, 2011, these facilities cannot be operated and the degree of contamination risk by radioactive iodine increases. Especially in this case, eliminating radioactive iodine diffused into peripheral areas falls into an extremely difficult situation, and it is concerned that a situation in which radioactive contamination expands may occur. Accordingly, there is an urgent need to develop a method for eliminating radioactive iodine that is applicable even when the situation in which the supply of the power source is suspended occurs.

CITATION LIST

Patent Literature

Patent Literature 1: JP-62-44239
Patent Literature 2: JP-A-2008-116280
Patent Literature 3: JP-A-2005-37133

SUMMARY OF INVENTION

Technical Problem

Accordingly, an object of the present invention is to solve the problems of prior arts in eliminating radioactive iodine and provide a method for eliminating radioactive iodine that is simple and low-cost, furthermore does not require an energy source such as electricity, moreover can take in and stably immobilize the eliminated radioactive iodine within a solid, and is capable of reducing the volume of radioactive waste as necessary. The present invention particularly intends to provide a hydrophilic resin that is capable of realizing the above-described elimination of radioactive iodine.

Solution to Problem

The object is achieved by the first or the second present invention described below. Namely, the present invention provides, in the first place, a method for eliminating radioactive iodine using a hydrophilic resin that adsorbs radioactive iodine in liquid and/or a solid body, wherein the hydrophilic resin is at least one selected from the group consisting of a hydrophilic polyurethane resin, a hydrophilic polyurea resin, and a hydrophilic polyurethane-polyurea resin and has a hydrophilic segment and, in the principal chain and/or a side chain in the structure thereof, a tertiary amino group.

A preferable embodiment of the first present invention includes that the hydrophilic segment is a polyethylene oxide segment; and the hydrophilic resin is a resin formed from, as a part of a raw material, a polyol having at least one tertiary amino group or a polyamine having at least one tertiary amino group.

Moreover, the present invention provides a hydrophilic resin described below that can preferably be used for the above-described method for eliminating radioactive iodine of the first present invention. For example, the present invention provides a hydrophilic resin for eliminating radioactive iodine having a function of fixing radioactive iodine in liquid and/or a solid body, wherein the hydrophilic resin is a resin formed from, as a part of a raw material, a polyol having at least one tertiary amino group or a polyamine having at least one tertiary amino group; having a hydrophilic segment and, in the molecular chain, a tertiary amino group; and being insoluble to water and hot water.

More specifically, the present invention provides a hydrophilic resin for eliminating radioactive iodine having a function of fixing radioactive iodine in liquid and/or a solid body, wherein the hydrophilic resin is any one of a hydrophilic polyurethane resin, a hydrophilic polyurea resin, and a hydrophilic polyurethane-polyurea resin, is obtained by reacting an organic polyisocyanate, a high molecular weight hydrophilic polyol and/or polyamine as a hydrophilic component, and a compound having at least one active hydrogen-containing group and at least one tertiary amino group in the same molecule, and has a hydrophilic segment and, in the molecular chain, a tertiary amino group.

The present invention provides, in the second place, a method for eliminating radioactive iodine using a hydrophilic resin that adsorbs radioactive iodine in liquid and/or a solid body, wherein the hydrophilic resin is at least one selected from the group consisting of a hydrophilic polyurethane resin, a hydrophilic polyurea resin, and a hydrophilic polyurethane-polyurea resin and has a hydrophilic segment and, in the principal chain and/or a side chain in the structure thereof, a tertiary amino group and a polysiloxane segment.

A preferable embodiment of the second present invention includes that the hydrophilic segment is a polyethylene oxide segment; the hydrophilic resin is a resin formed from, as a part of a raw material, a polyol having at least one tertiary amino group or a polyamine having at least one tertiary amino group and a compound having at least one active hydrogen-containing group and a polysiloxane segment in the same molecule.

Moreover, the present invention provides a hydrophilic resin described below that can preferably be used for the above-described method for eliminating radioactive iodine of the second present invention. For example, the present invention provides a hydrophilic resin for eliminating radioactive iodine having a function of immobilizing radioactive iodine in liquid and/or a solid body, wherein the hydrophilic resin is a resin obtained by reacting a polyol having at least one tertiary amino group or a polyamine having at least one tertiary amino group with a compound having at least one active hydrogen-containing group and a polysiloxane segment in the same molecule; having a hydrophilic segment and, in the molecular chain, a tertiary amino group and a polysiloxane segment; and being insoluble to water and hot water.

More specifically, the present invention provides a hydrophilic resin for eliminating radioactive iodine having a function of immobilizing radioactive iodine in liquid and/or a solid body, wherein the hydrophilic resin is any one selected from a group consisting of a hydrophilic polyurethane resin, a hydrophilic polyurea resin, and a hydrophilic polyurethane-polyurea resin, is obtained by reacting an organic polyisocyanate, a high molecular weight hydrophilic polyol and/or polyamine as a hydrophilic component, a compound having at least one active hydrogen-containing group and at least one tertiary amino group in the same molecule, and a compound having at least one active hydrogen-containing group and a polysiloxane segment in the same molecule; and has a hydrophilic segment and, in the molecular chain, a tertiary amino group and a polysiloxane segment A more preferable embodiment for any of the above-described hydrophilic resins includes a hydrophilic resin for eliminating radioactive iodine, wherein the hydrophilic segment is a polyethylene oxide segment.

Advantageous Effects of Invention

By means of the present invention, a novel method for eliminating radioactive iodine is provided that is simple and low-cost, furthermore does not require an energy source such as electricity, moreover can take in and stably immobilize the eliminated radioactive iodine within a solid, and is capable of reducing the volume of radioactive waste as necessary in eliminating radioactive iodine. The present invention provides hydrophilic resins each having a particular structure described below and capable of realizing the above-described excellent method for eliminating radioactive iodine and methods for eliminating radioactive iodine respectively using the respective hydrophilic resins.

The first present invention provides a hydrophilic resin having, in the structure thereof, a hydrophilic segment and, in the molecular chain, at least one tertiary amino group and a method for eliminating radioactive iodine using the hydrophilic resin. More specifically, the first present invention provides a hydrophilic resin that is any one selected from the group consisting of a hydrophilic polyurethane resin, a hydrophilic polyurea resin, and a hydrophilic polyurethane-polyurea resin, is obtained by reacting an organic polyisocyanate, a high molecular weight hydrophilic polyol and/or polyamine, and a compound having at least one active hydrogen-containing group and at least one amino group in the same molecule, and has a hydrophilic segment and, in the molecular chain, a tertiary amino group. The resins included in the above hydrophilic resin have a function of fixing and immobilizing radioactive iodine in radioactive waste liquid or a radioactive solid body and are extremely useful in the method for eliminating radioactive iodine in liquid and/or a solid body.

The second present invention provides a hydrophilic resin having, in the structure thereof, a hydrophilic segment and, in the molecular chain, at least one tertiary amino group and a polysiloxane segment and a method for eliminating radioactive iodine using the hydrophilic resin. More specifically, the second present invention provides a hydrophilic resin that is any one selected from the group consisting a hydrophilic polyurethane resin, a hydrophilic polyurea resin, and a hydrophilic polyurethane-polyurea resin, the hydrophilic resin, is obtained by reacting an organic polyisocyanate, a high molecular weight hydrophilic polyol and/or polyamine, a compound having at least one active hydrogen-containing group and at least one tertiary amino group in the same molecule, and a compound having at least one active hydrogen-containing group and a polysiloxane segment in the same molecule, and has a hydrophilic segment and, in the molecular chain, a tertiary amino group and a polysiloxane segment. The resins included in the above hydrophilic resin have a function of fixing and immobilizing radioactive iodine in radioactive waste liquid or a radioactive solid body and is extremely useful in the method for eliminating radioactive iodine in liquid and/or a solid body.

In addition, a “hydrophilic resin” in the present invention means a resin that is insoluble to water, hot water and so on although the resin has a hydrophilic group in the molecule thereof and is distinguished from a water soluble resin such as polyvinyl alcohols, polyvinyl pyrrolidones, polyacrylic acids, or cellulose derivatives.

BRIEF DESCRIPTION OF DRAWINGS

FIG. 1 is a graph showing the relation between the iodine concentration in each aqueous solution and the immersion time of each film comprising a hydrophilic resin of Examples 1-1 to 1-3 that characterizes the first present invention.

FIG. 2 is a graph showing the relation between the iodine concentration of each aqueous solution and the immersion time of each film comprising a resin of Comparative Examples 1-1 to 1-3 that is used for the comparison with the first present invention.

FIG. 3 is a graph showing the relation between the iodine concentration in each aqueous solution and the immersion time of each film comprising a hydrophilic resin of Examples 2-1 to 2-3 that characterizes the second present invention.

FIG. 4 is a graph showing the relation between the iodine concentration of each aqueous solution and the immersion time of each film comprising a resin of Comparative Examples 2-1 to 2-3 that is used for the comparison with the second present invention.

DESCRIPTION OF EMBODIMENTS

Next, the first present invention and the second present invention will be explained in more detail giving preferable embodiments respectively.

(First Present Invention)

Hereinafter, a hydrophilic resin that characterizes the first present invention will be explained. The hydrophilic resin that constitutes the first invention may be a hydrophilic resin having a hydrophilic segment that contains a hydrophilic component as a constituent unit and a tertiary amino group-containing segment that contains a component having at least one tertiary amino group as a constituent unit in the structure thereof. These segments are, in the case where a chain extender is not used at the time of synthesizing the hydrophilic resin, randomly connected through a urethane bond, a urea bond, a urethane-urea bond, or the like respectively. In the case where a chain extender is used at the time of synthesizing the hydrophilic resin, the hydrophilic resin becomes a hydrophilic resin in which a short chain as a residue of the chain extender exists, together with the above bonds, between the above bonds.

With regard to the reason why the simple elimination of radioactive iodine has been achieved by using the hydrophilic resin having the above-described structure, the present inventors consider as follows. The hydrophilic resin exhibits excellent water absorbency because of the hydrophilic segment in the structure thereof, furthermore an ion bond is formed between the amino group and ionized radioactive iodine by a tertiary amino group being introduced in the structure of the hydrophilic resin, and as a result thereof, radioactive iodine is thought to be fixed within the resin.

However, under the presence of moisture, the above-described ion bond is liable to dissociate, radioactive iodine is considered to be discharged again from the resin after a certain amount of time is passed, and the present inventors have anticipated that it is difficult to immobilize the fixing state of radioactive iodine within the resin. However, contrary to the anticipation, the present inventors have found that ionically bonded radioactive iodine, in fact, remains to be fixed within the resin after a long period of time is passed. The reason is uncertain, however the present inventors estimate, as this reason, that the hydrophilic resin also has a hydrophobic part within the molecule and the hydrophobic part surrounds the circumferences of the hydrophilic part (the hydrophilic segment) and the ion bond formed by the tertiary amino group after the ion bond is formed between the tertiary amino group in the resin and radioactive iodine.

As the hydrophilic resin that is essential to the method for eliminating radioactive iodine of the first present invention capable of realizing the above-described remarkable effect, it is effective to use, for example, a hydrophilic polyurethane resin, a hydrophilic polyurea resin, or a hydrophilic polyurethane-polyurea resin which is obtained by reacting an organic polyisocyanate, a high molecular weight hydrophilic polyol and/or polyamine ("hydrophilic component"), and a compound having at least one active hydrogen-containing group (hereinafter, sometimes referred to as reactive group) and at least one tertiary amino group in the same molecule and has, in the structure thereof, a hydrophilic segment and a tertiary amino group-containing segment (hereinafter, the resin is also referred to as the first hydrophilic resin).

Next, a raw material for forming the above-described first hydrophilic resin suitable for the method for eliminating radioactive iodine of the first present invention will be explained. The hydrophilic resin is required to have a hydrophilic segment and a tertiary amino group in the structure thereof and therefore is formed from, as a part of a raw material, a polyol having at least one tertiary amino group or a polyamine having at least one tertiary amino group. Namely, since it is necessary that at least a tertiary amino group be introduced in producing the first hydrophilic resin, it is preferable to use a tertiary amino group-containing compound as listed below. Specifically, a compound having at least one reactive group, as an active hydrogen-containing group, such as, for example, an amino group, an epoxy group, a hydroxyl group, a mercapto group, an acid halide group, a carboxy ester group, or an acid anhydride group in the molecule and, in the molecular chain, a tertiary amino group is used.

Specific preferable examples of the above-described tertiary amino group-containing compound having a reactive group include compounds represented by the following formulas (1) to (3).

(1)

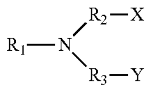

[In the above formula (1), $R_1$ represents an alkyl group having 20 or less carbon atoms, an alicyclic group, or an aromatic group (which may be substituted with a halogen or an alkyl group), $R_2$ and $R_3$ represent an alkylene group which may be linked with —O—, —CO—, —COO—, —NHCO—, —S—, —SO—, —$SO_2$—, or the like, X and Y represent a reactive group such as —OH, —COOH, —$NH_2$, —$NHR_1$ (the definition of $R_1$ is the same definition as described above), or —SH, and X and Y may be the same or different; moreover, X and Y may be a group capable of deriving the above reactive group such as an epoxy group, an alkoxy group, an acid halide group, an acid anhydride group, or a carboxy ester group.]

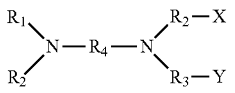

(2)

[In the above formula (2), the definition of $R_1$, $R_2$, $R_3$, X, and Y is the same definition as in the above formula (1), however the two $R_1$ may form a cyclic structure; $R_4$ represents $—(CH_2)_n—$ (n is an integer of 0 to 20).]

X—W—Y (3)

[The definition X and Y in the formula (3) is the same definition as in the above formula (1), W represents any one of a nitrogen-containing heterocyclic ring, a nitrogen- and oxygen-containing heterocyclic ring, or a nitrogen- and sulfur-containing heterocyclic ring.]

Specific examples of the compounds represented by the above general formula (1), (2), and (3) include the following compounds. The compounds include N-methyldiethanolamine, N,N-dihydroxyethyl-methylamine, N,N-dihydroxyethyl-ethylamine, N,N-dihydroxyethyl-isopropylamine, N, N-dihydroxyethyl-n-butylamine, N,N-dihydroxyethyl-t-butylamine, methyliminobispropylamine, N,N-dihydroxyethylaniline, N,N-dihydroxyethyl-m-toluidine, N,N-dihydroxyethyl-p-toluidine, N,N-dihydroxyethyl-m-chloroaniline, N,N-dihydroxyethylbenzylamine, N,N-dimethyl-N',N'-dihydroxyethyl-1,3-diaminopropane, N,N-diethyl-N',N'-dihydroxyethyl-1,3-diaminopropane, N-hydroxyethyl-piperazine, N,N-dihydroxyethyl-piperazine, N-hydroxyethoxyethyl-piperazine, 1,4-bisaminopropyl-piperazine, N-aminopropyl-piperazine, dipicolinic acid, 2,3-diaminopyridine, 2,5-diaminopyridine, 2,6-diamino-4-methylpyridine, 2,6-dihydroxypyridine, 2,6-pyridine-dimethanol, 2-(4-pyridyl)-4,6-dihydroxypyrimidine, 2,6-diaminotriazine, 2,5-diaminotriazole, and 2,5-diaminooxazole.

Moreover, an ethylene oxide adduct or a propylene oxide adduct of the above tertiary amino compounds may also be used in the present invention. Examples of the adduct include compounds represented by the following structural formula. In addition, m in the following formula represents an integer of 1 to 60, and n represents an integer of 1 to 6.

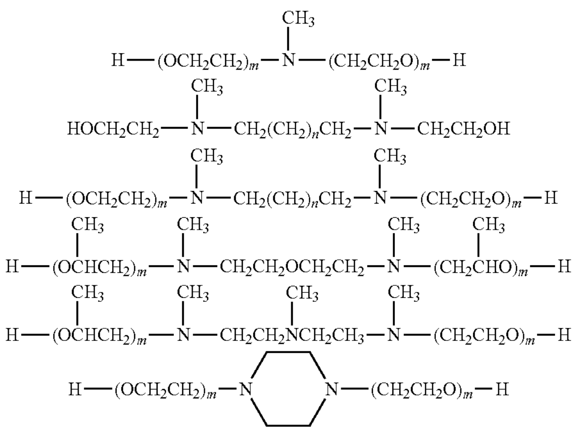

-continued

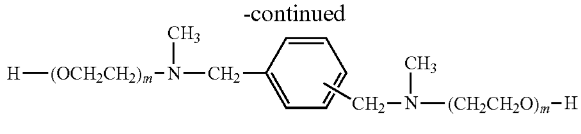

The organic polyisocyanate to be used in the synthesis of the first hydrophilic resin is not particularly limited, and any of publicly known organic polyisocyanates used in the conventional synthesis of polyurethane resins may be used. Preferable examples include 4,4'-diphenylmethanediisocyanate (abbreviated as MDI), dicyclohexylmethane-4,4'-diisocyanate (abbreviated as hydrogenated MDI), isophorone diisocyanate, 1,3-xylylene diisocyanate, 1,4-xylylene diisocyanate, 2,4-tolylene diisocyanate, m-phenylene diisocyanate, and p-phenylene diisocyanate. Or a polyurethane prepolymer or the like obtained by reacting the above organic polyisocyanate and a low molecular weight polyol or polyamine so as to form a terminal isocyanate may be used.

As a hydrophilic component to be used together with the above-described organic polyisocyanate in the synthesis of the first hydrophilic resin, a hydrophilic compound having a hydroxyl group, an amino group, a carboxyl group, or the like and a weight average molecular weight in the range of 400 to 8000 is preferable. Examples of a hydrophilic polyol having a terminal hydroxyl group include a polyethylene glycol, a polyethylene glycol/polytetramethylene glycol copolymerized polyol, a polyethylene glycol/polypropylene glycol copolymerized polyol, a polyethylene glycol adipate polyol, a polyethylene glycol succinate polyol, a polyethylene glycol/poly ε-lactone copolymerized polyol, and a polyethylene glycol/polyvalerolactone copolymerized polyol.

Examples of a hydrophilic polyamine having a terminal amino group include polyethylene oxide diamines, polyethylene oxide propylene oxide diamines, polyethylene oxide triamines, and polyethylene oxide propylene oxide triamines. Besides these compounds, ethylene oxide adducts and the like having a carboxyl group or a vinyl group are included.

In the present invention, another polyol, polyamine, polycarboxylic acid, or the like that does not have a hydrophilic chain may be used together with the above hydrophilic component for the purpose of imparting water resistance to the hydrophilic resin.

The chain extender to be used as necessary in the synthesis of the first hydrophilic resin is not particularly limited, and any of the conventionally known chain extenders such as, for example, a low molecular weight diol and diamine, may be used. For example, ethylene glycol, 1,3-propanediol, 1,4-butanediol, 1,5-pentanediol, ethylenediamine, hexamethylenediamine, and so on may be used.

It is preferable that the first hydrophilic resin obtained by using the above ingredients has a weight average molecular weight (measured by a GPC in terms of a standard polystyrene) in the range from 3,000 to 800,000. The more preferable weight average molecular weight is in the range of 5,000 to 500,000.

As for the first hydrophilic resin especially suitable for the method for eliminating radioactive iodine of the first present invention, it is preferable that the content of the tertiary amino group in the resin is in the range of 0.1 to 50 eq (equivalent)/kg, more preferably 0.5 to 20 eq/kg. It is not preferable that the content of the tertiary amino group is less than 0.1 eq/kg, namely less than 1 amino groups per 10,000 molecular weight, because the exhibition of the iodine elimination properties, the intended purpose of the present invention, is liable to become insufficient, and on the other hand, it is not preferable that the content of the tertiary amino group exceeds 50 eq/kg, namely exceeding 500 amino groups per 10,000 molecular weight, because the hydrophobicity becomes strong due to reduction of the hydrophilic part in the resin and the first hydrophilic resin becomes inferior in water-absorbing performance.

Moreover, it is preferable that the content of the hydrophilic segment that constitutes the first hydrophilic resin especially suitable for the present invention is in the range of 30 to 80 mass %, more preferably in the range of 50 to 75 mass %. It is not preferable that the content of the hydrophilic segment is less than 30 mass % because the hydrophilic resin becomes inferior in water-absorbing performance and the radioactive iodine elimination properties are deteriorated. On the other hand, it is not preferable that the content of the hydrophilic segment exceeds 80 mass % because the hydrophilic resin becomes inferior in water resistance.

In the method for eliminating radioactive iodine of the first present invention, it is preferable to use the first hydrophilic resin, for example, in an embodiment as described below. Namely, the embodiment includes, when using the first hydrophilic resin, a film obtained by coating a resin solution obtained from the aforementioned raw materials on release paper, film or the like in such a way that the thickness after drying becomes 5 to 100 μm, preferably 10 to 50 μm and drying the resultant coated paper or film in a drying furnace. In this case, the first hydrophilic resin is used as a film for adsorbing radioactive iodine by peeling the film from the release paper/film at the time of use. Moreover, besides, the resin solution obtained from the aforementioned raw materials may be used by coating on or immersing in various base materials. As a base material in this case, metal, glass, wood, fiber, various plastics, and the like may be used.

Radioactive iodine in liquid can selectively be eliminated by immersing the film made of the first hydrophilic resin or respective coated sheets of various base materials which film or sheets are obtained by the manner as described above in radioactive waste liquid, waste liquid in which a radioactive solid body is decontaminated by water in advance, or the like. Moreover, the diffusion of radioactive iodine can be prevented by covering a solid body or the like contaminated by radioactivity with the film or sheet made of the first hydrophilic resin.

Since the film or sheet made of the first hydrophilic resin is insoluble to water, the film or sheet can easily be taken out from the waste liquid after decontamination. In this way, the decontamination can be carried out simply and at low cost without the need for special facilities and electricity in eliminating radioactive iodine. Furthermore, when the absorbed moisture is dried and heated to 100 to 150° C., the effect of reducing the volume of radioactive waste can be expected because the volumetric shrinkage of the resin occurs due to softening of the resin.

(The Second Present Invention)

Next, the second present invention will be explained in detail giving preferable embodiments thereof.

The hydrophilic resin that constitutes the second present invention may be a hydrophilic resin having a hydrophilic segment that contains a hydrophilic component as a constituent unit, a tertiary amino group-containing segment that contains a component having at least one tertiary amino group as a constituent unit, and a polysiloxane unit in the structure thereof. These segments are, in the case where a chain extender is not used at the time of synthesizing the hydrophilic resin, randomly connected through a urethane bond, a urea bond, a urethane-urea bond, or the like respectively. In the case where a chain extender is used at the time of synthesizing the hydrophilic resin, a short chain as a residue of the chain extender exists, together with the above bonds, between the above bonds.

With regard to the reason why the simple elimination of radioactive iodine has been achieved by using the hydrophilic resin having the above-described structure, the present inventors consider as follows. The hydrophilic resin to be used in the present invention exhibits excellent water absorbency because of the hydrophilic segment in the structure thereof in the same way as the hydrophilic resin to be used in the first present invention explained earlier, furthermore an ion bond is formed between the amino group and ionized radioactive iodine by a tertiary amino group being introduced in the structure of the hydrophilic resin, and as a result thereof, radioactive iodine is thought to be fixed within the resin.

However, under the presence of moisture, the above-described ion bond is liable to dissociate, radioactive iodine is considered to be discharged again from the resin after a certain amount of time is passed, and the present inventors have anticipated that it is difficult to immobilize the fixing state of radioactive iodine within the resin. However, contrary to the anticipation, the present inventors have found that conically bonded radioactive iodine, in fact, remains to be fixed within the resin after a long period of time is passed. The reason is uncertain, however the present inventors estimate that the hydrophilic resin having a specific structure and being used in the present invention also has a hydrophobic part within the molecule and the hydrophobic part surrounds the circumferences of the hydrophilic part (the hydrophilic segment) and the ion bond formed by the tertiary amino group after the ion bond is formed between the tertiary amino group in the resin and radioactive iodine.

Furthermore, the hydrophilic resin to be used in the second present invention is required to have a polysiloxane segment in the structure thereof, and the reason is as follows. The polysiloxane to be introduced in the resin molecule is fundamentally hydrophobic (water-repellent), however in the case where the polysiloxane segment is introduced by the amount of a certain range, the resin is known to become a resin having "environmental responsiveness" (see KOBUNSHI RONBUNSHU vol. 48, no. 4, p. 227 (1991)). Namely, "Environmental responsiveness" in a resin as described in the literature is a phenomenon that the surface of the resin is completely covered by a polysiloxane segment in a dry state, however, in the state in which the resin is immersed in water, the polysiloxane segment is buried in the resin.

The second present invention utilizes the phenomenon of the "environmental responsiveness" exhibited by the resin as a result of introducing a polysiloxane segment in the elimination processing of radioactive iodine. As described earlier, when an ion bond is formed between the tertiary amino group introduced in the hydrophilic resin and the radioactive iodine as an object of the processing, the hydrophilicity of the resin is further increased and, as a result thereof, to the contrary, there is a risk that the following problem occurs. Namely, in the method for eliminating radioactive iodine of the present invention, the hydrophilic resin is used, for example, in the form of a film or the like as described later for the purpose of carrying out an elimination processing by immobilizing radioactive iodine, however in such a case, when the amount of radioactive iodine to be processed is large, there is a risk that poses a problem for the water resistance required for the resin. Against this risk, the second present invention realizes the resin constitution by which the resin to be used exhibits sufficient water resistance and the processing is effectively carried out by further introducing a polysiloxane segment in the molecular (in the structure) of the hydrophilic resin to be used even in the above described case. Namely, the hydrophilic resin that characterizes the second present invention becomes more useful when used for the elimination processing of iodine by realizing the water resistance of the resin and the blocking resistance (sticking resistance) performance on the surface achieved by further introducing a polysiloxane segment in addition to the water-absorbing performance achieved by the hydrophilic segment introduced in the structure thereof and the fixing performance to radioactive iodine achieved by the tertiary amino group introduced in the structure thereof.

As the hydrophilic resin that is essential in the method for eliminating radioactive iodine of the second present invention capable of realizing the above-described remarkable effect, it is effective to use, for example, a hydrophilic resin selected from a hydrophilic polyurethane resin, a hydrophilic polyurea resin, and a hydrophilic polyurethane-polyurea resin; obtained by reacting an organic polyisocyanate, a high molecular weight hydrophilic polyol and/or polyamine ("hydrophilic component"), a compound having at least one active hydrogen-containing group and at least one tertiary amino group in the same molecule, and a compound having at least one active hydrogen-containing group and a polysiloxane segment in the same molecule; and having a hydrophilic segment and, in the molecular chain, a tertiary amino group and a polysiloxane segment (hereinafter, the resin is also referred to as "the second hydrophilic resin").

Next, a raw material for forming the above-described second hydrophilic resin suitable for the method for eliminating radioactive iodine of the second present invention will be explained. The hydrophilic resin is required to have a hydrophilic segment, a tertiary amino group, and a polysiloxane segment in the structure thereof and therefore it is preferable to use, as a part of a raw material, a polyol having at least one tertiary amino group or a polyamine having at least one tertiary amino group and a compound having at least one active hydrogen-containing group and a polysiloxane segment in the same molecule in order to obtain the second hydrophilic resin. It is preferable to use a "tertiary amino group-containing compound" that is used for introducing a tertiary amino group in the hydrophilic in producing the second hydrophilic resin, however the explanation with regard to the preferable specific examples is omitted because the specific preferable examples are the same as those described earlier in the first hydrophilic resin.

The second hydrophilic resin is required to have a polysiloxane segment in the structure thereof, and hereinafter the explanation will be given with regard to the polysiloxane segment. Examples of the polysiloxane compound that can be used in order to introduce a polysiloxane segment in the hydrophilic resin molecule include a compound having one or two or more reactive groups such as, for example, an amino group, an epoxy group, a hydroxyl group, a mercapto group, and a carboxyl group. Preferable examples of the polysiloxane compound having a reactive group as described above include the following compounds.

Amino-Modified Polysiloxane Compounds

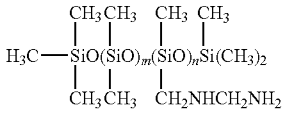

(m = 1~200, n = 2~200)

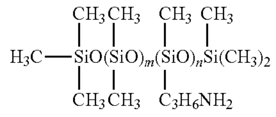

(m = 1~200, n = 2~200)

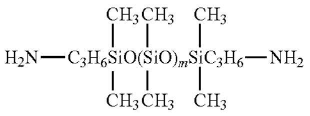

(m = 1~300)

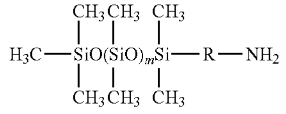

(m = 1~300, R = a lower alkylene group)

Epoxy-Modified Polysiloxane Compounds

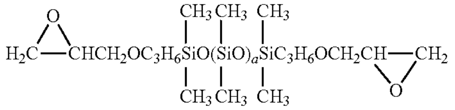

(a = 1~300)

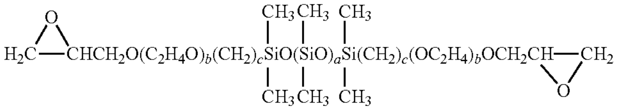

(a = 1~300, b = 1~300, c = 2~6)

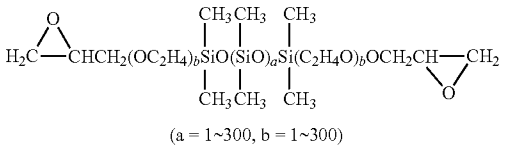

(a = 1~300, b = 1~300)

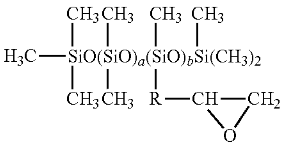

(a = 1~300, b = 2~200, R = a lower alkylene group)

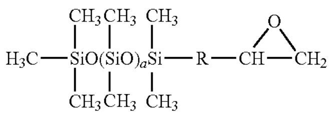

(a = 1~300, R = a lower alkylene group)

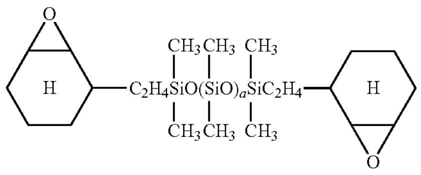

(a = 1~300)

-continued

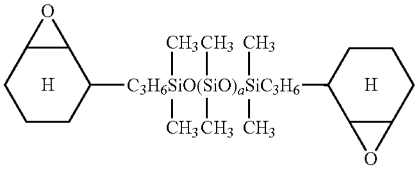

(a = 1~300)

Alcohol-Modified Polysiloxane Compounds

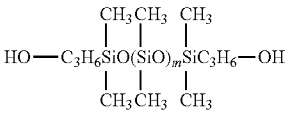

(m = 1~300)

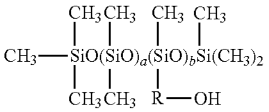

(a = 1~300, b = 2~200, R = a lower alkylene group)

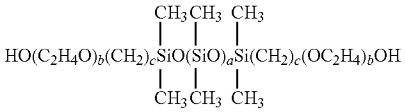

(a = 1~300, b = 1~300, c = 2~6)

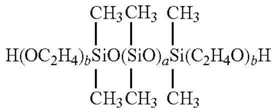

(a = 1~300, b = 1~300, c = 2~6)

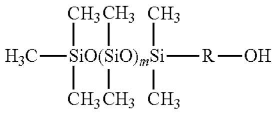

(m = 1~300, R = a lower alkylene group)

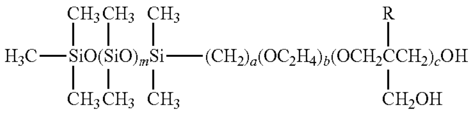

(m = 1~300, a = 0~5, b = 0~50, c = 1~3, R = H or an alkyl group)

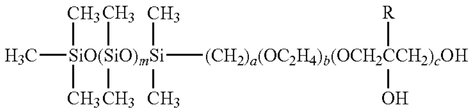

(m = 1~300, a = 0~5, b = 0~50, c = 1~3, R = H or an alkyl group)

Mercapto-Modified Polysiloxane Compounds

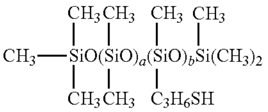

(a = 1~300, b = 2~200)

-continued

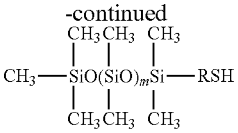

(m = 1~300, R = a lower alkylene group)

Carboxyl-Modified Polysiloxane Compounds

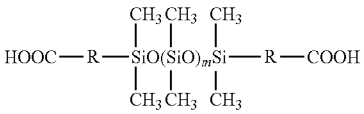

(m = 1~300, R = a lower alkylene group)

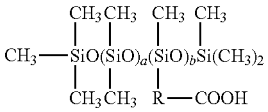

(a = 1~300, b = 2~200, R = a lower alkylene group)

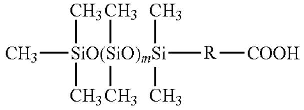

(m = 1~300, R = a lower alkylene group)

Among polysiloxane compounds having an active hydrogen-containing group listed above, polysiloxane polyols or polysiloxane polyamines are particularly useful. In addition, all the listed compounds are preferable compounds to be a raw material of the second hydrophilic resin that is used in the second present invention and the present invention is not limited at all to these compounds listed as examples. Accordingly, in the production of the second hydrophilic compounds, not only the above compounds listed as examples but also any of the compounds currently on the market and readily available from the market may be used in the present invention.

The organic polyisocyanate to be used in the synthesis of the hydrophilic resin that characterizes the second present invention is not particularly limited, and any of publicly known organic polyisocyanates used in the conventional synthesis of polyurethane resins may be used. The explanation with regard to the preferable organic polyisocyanates is omitted because the preferable organic polyisocyanates are the same as those listed as examples earlier in the explanation of the first hydrophilic resin. Moreover, as the hydrophilic component to be used together with the organic polyisocyanate in the synthesis of the second hydrophilic resin, a hydrophilic compound having a hydroxyl group, an amino group, a carboxyl group, or the like and a weight average molecular weight in the range of 400 to 8,000 is preferable. The explanation with regard to a hydrophilic polyol having a terminal hydroxyl group and a hydrophilic polyamine having a terminal hydroxyl group which can be used in the synthesis of the second hydrophilic resin is also omitted because these compounds are the same as those listed as examples earlier in the explanation of the first hydrophilic resins.

In the same way as the case of the first hydrophilic resin explained earlier, another polyol, polyamine, polycarboxylic acid, or the like that does not have a hydrophilic chain may be used together with the above hydrophilic component for the purpose of imparting water resistance to the hydrophilic resin.

As the chain extender to be used as necessary in the synthesis of the second hydrophilic resin, the same chain extenders as those in the case of the first hydrophilic resins explained earlier may be used.

It is preferable that the second hydrophilic resin obtained by using the above ingredients and has a hydrophilic segment, a tertiary amino group, and a polysiloxane segment in the molecular chain has a weight average molecular weight (measured by a GPC in terms of a standard polystyrene) in the range from 3,000 to 800,000. The more preferable weight average molecular weight is in the range of 5,000 to 500,000.

As for the second hydrophilic resin especially suitable for using for the method for eliminating radioactive iodine of the second present invention, it is preferable that the content of the tertiary amino group in the resin is in the range of 0.1 to 50 eq (equivalent)/kg, more preferably 0.5 to 20 eq/kg. It is not preferable that the content of the tertiary amino group is less than 0.1 eq/kg, namely less than 1 amino groups per 10,000 molecular weight, because the exhibition of the iodine elimination properties, the intended purpose of the present invention, becomes insufficient, and on the other hand, it is not preferable that the content of the tertiary amino group exceeds 50 eq/kg, namely exceeding 500 amino groups per 10,000 molecular weight, because the hydrophobicity becomes strong due to reduction of the hydrophilic part in the resin and the second hydrophilic resin becomes inferior in water-absorbing performance.

It is preferable that the content of the polysiloxane segment that constitutes the second hydrophilic resin especially suitable for the second present invention is in the range of 0.1 to 12 mass %, particularly preferably 0.5 to 10 mass %. It is not preferable that the content of the polysiloxane segment is less than 0.1 mass % because the exhibition of the water resistance and the blocking resistance on the surface, the objects of the present invention, becomes insufficient, and on the other hand, it is not preferable that the content of the polysiloxane segment exceeds 12 mass % because the water-repellent property becomes strong due to the polysiloxane segment, the water-absorbing performance is deteriorated, and the radioactive iodine adsorbing properties are inhibited.

Moreover, it is preferable that the content of the hydrophilic segment in the hydrophilic resin especially suitable for the second present invention is in the range of 30 to 80 mass %, more preferably in the range of 50 to 75 mass %. It is not preferable that the content of the hydrophilic segment is less than 30 mass % because the hydrophilic resin becomes inferior in water-absorbing performance and the radioactive iodine elimination properties are deteriorated. On the other hand, it is not preferable that the content of the hydrophilic segment exceeds 80 mass % because the hydrophilic resin becomes inferior in water resistance.

Also in the method for eliminating radioactive iodine of the second present invention, the second hydrophilic resin comprising the above-described constitution may be used in the same embodiment as in the case of the first hydrophilic resin explained earlier. Namely, as explained earlier in the case of the first hydrophilic resin, the second hydrophilic resin may be used as a film for eliminating radioactive iodine by forming a film from the second hydrophilic resin and peeling the film from release paper/film at the time of use or may be used by coating the second hydrophilic resin on or immersing the second hydrophilic resin in the various base materials. As a base material also in this case, metal, glass, wood, fiber, various plastics, and the like may be used in the same way as those explained earlier.

In the method for eliminating radioactive iodine of the second present invention, radioactive iodine can selectively be eliminated by immersing the film made of the second hydrophilic resin or respective coated sheets of various base materials which film or sheets are obtained by the manner as described above in radioactive waste liquid, waste liquid in which a radioactive solid body is decontaminated by water in advance, or the like. Moreover, the diffusion of radioactive iodine can be prevented by covering a solid body or the like contaminated by radioactivity with the film or sheet of the second hydrophilic resin.

Moreover, since the film or sheet made of the second hydrophilic resin is insoluble to water, the film or sheet can easily be taken out from the waste liquid after decontamination. In this way, the decontamination can be carried out simply and at low cost without the need for special facilities and electricity in eliminating radioactive iodine. Furthermore, when the absorbed moisture is dried and heated to 100 to 150° C., the effect of reducing radioactive waste can be expected because the volumetric shrinkage of the resin occurs due to softening of the resin.

EXAMPLES

Next, the first and second present invention will be explained in more detail giving specific Examples and Comparative Examples, however the present invention is not limited to these Examples. Moreover, "parts" and "%" in each of the following examples are based on mass unless otherwise noted.

(First Present Invention)

[Example 1-1] (Hydrophilic Polyurethane Resin Having Tertiary Amino Group)

A reaction vessel equipped with a stirrer, a thermometer, a gas introducing tube, and a reflux cooler was purged with nitrogen, then 150 parts of a polyethylene glycol (molecular weight 2,040), 20 parts of N-methyldiethanolamine, and 5 parts of diethylene glycol were dissolved in a mixed solvent of 200 parts of methyl ethyl ketone and 150 parts of dimethylformamide, and the resultant mixture was stirred well at 60° C. Then a solution in which 74 parts of hydrogenated MDI was dissolved in 112 parts of methyl ethyl ketone was slowly dropped in the mixture under stirring. After the completion of the dropping, the resultant mixture was subjected to reaction at 80° C. for 6 hours to obtain a hydrophilic resin solution of the present Example comprising the aforementioned first hydrophilic resin. The resin solution had a solid content of 35% and a viscosity of 530 dPa·s (25° C.). Moreover, a hydrophilic resin film of the present Example formed from the solution had a breaking strength of 24.5 MPa, a breaking elongation of 450%, and a thermal softening temperature of 115° C.

[Example 1-2] (Hydrophilic Polyurea Resin Having Tertiary Amino Group)

In a reaction vessel similar to the one used in Example 1-1, 150 parts of a polyethylene oxide diamine ("JEFFAMINE ED" manufactured by Huntsman Corporation; molecular weight 2,000), 30 parts of methyliminobispropylamine, and 4 parts of 1,4-diaminobutane were dissolved in 200 parts of dimethylformamide and the resultant mixture was stirred well at an internal temperature of 20 to 30° C. Then a solution in which 83 parts of hydrogenated MDI was dissolved in 100 parts of dimethylformamide was slowly dropped in the mixture under stirring. After the completion of the dropping, the internal temperature was gradually raised, and when the temperature reached 50° C., the resultant mixture was subjected to reaction for further 6 hours, and thereafter 195 parts of dimethylformamide was added to the reaction mixture to obtain a hydrophilic resin solution of the present Example comprising the aforementioned first hydrophilic resin. The resin solution had a solid content of 35% and a viscosity of 230 dPa·s (25° C.). A hydrophilic resin film of the present Example formed from the solution had a breaking strength of 27.6 MPa, a breaking elongation of 310%, and a thermal softening temperature of 145° C.

[Example 1-3] (Hydrophilic Polyurethane-Polyurea Resin Having Tertiary Amino Group)

In a reaction vessel similar to the one used in Example 1-1, 150 parts of a polyethylene oxide diamine ("JEFFAMINE ED" manufactured by Huntsman Corporation; molecular weight 2,000), 30 parts of N,N-dimethyl-N',N'-dihydroxyethyl-1,3-diaminopropane, and 6 parts of triethylene glycol were dissolved in 140 parts of dimethylformamide. Then, while the resultant mixture was stirred well at an internal temperature of 20 to 30° C., a solution in which 70 parts of hydrogenated MDI was dissolved in 200 parts of methyl ethyl ketone was slowly dropped in the mixture. After the completion of the dropping, the resultant mixture was subjected to reaction at 80° C. for 6 hours, and thereafter 135 parts of methyl ethyl ketone was added to the reaction mixture to obtain a hydrophilic resin solution of the present Example comprising the aforementioned first hydrophilic resin. The resin solution had a solid content of 35% and a viscosity of 280 dPa·s (25° C.). Moreover, a hydrophilic resin film of the present Example formed from the solution had a breaking strength of 14.7 MPa, a breaking elongation of 450%, and a thermal softening temperature of 107° C.

[Comparative Example 1-1] (Hydrophilic Polyurethane Resin not Having Tertiary Amino Group)

A solution of a hydrophilic polyurethane resin not containing a tertiary amino group in the molecular chain of the present Comparative Example was obtained by using the same ingredients and formulation as in Example 1-1 except that N-methyldiethanolamine was not used. The resin solution had a solid content of 35% and a viscosity of 500 dPa·s (25° C.). Moreover, a hydrophilic resin film of the present Comparative Example formed from the resin solution had a breaking strength of 21.5 MPa, a breaking elongation of 400%, and a thermal softening temperature of 102° C.

[Comparative Example 1-2] (Non-Hydrophilic Polyurethane Resin not Having Tertiary Amino Group)

A reaction vessel was purged with nitrogen in the same manner as in Example 1-1, 150 parts of a polybutylene adipate having an average molecular weight of about 2,000 and 15 parts of 1,4-butanediol were dissolved in 250 parts of dimethylformamide, and the resultant mixture was stirred well at 60° C. Then a solution in which 62 parts of hydrogenated MDI was dissolved in 171 parts of dimethylformamide was slowly dropped in the mixture under stirring, and after the completion of the dropping, the resultant mixture was subjected to reaction at 80° C. for 6 hours, and thereby a solution of a non-hydrophilic polyurethane resin not having a tertiary amino group of the present Comparative Example was obtained. The resin solution had a solid content of 35% and a viscosity of 3.2 MPa·s (25° C.). A non-hydrophilic resin film of the present Comparative Example formed from the solution had a breaking strength of 45 MPa, a breaking elongation of 480%, and a thermal softening temperature of 110° C.

[Comparative Example 1-3] (Non-Hydrophilic Polyurethane Resin Having Tertiary Amino Group)

A reaction vessel was purged with nitrogen in the same manner as in Example 1-1, and 150 parts of a polybutylene adipate having an average molecular weight of about 2,000, 20 parts of N-methyldiethanolamine, and 5 parts of diethylene glycol were dissolved in a mixed solvent of 200 parts of methyl ethyl ketone and 150 parts of dimethylformamide. Then, while the resultant mixture was stirred well at 60° C., a solution in which 74 parts of hydrogenated MDI was dissolved in 112 parts of methyl ethyl ketone was slowly dropped in the mixture. After the completion of the dropping, the resultant mixture was subjected to reaction at 80° C. for 6 hours to obtain a solution of a non-hydrophilic polyurethane resin having a tertiary amino group of the present Comparative Example. The resin solution had a solid content of 35% and a viscosity of 510 dPa·s (25° C.). Moreover, a non-hydrophilic resin film of the present Comparative Example formed from the solution had a breaking strength of 23.5 MPa, a breaking elongation of 470%, and a thermal softening temperature of 110° C.

The weight average molecular weight and the amount of a tertiary amino group per 1,000 weight average molecular weight of each resin of Examples 1-1 to 1-3 and Comparative Examples 1-1 to 1-3 obtained as described above were as shown in Table 1.

TABLE 1

Properties of respective resins in Examples and Comparative Examples

| | Hydrophilic/ Non-hydrophilic | Weight average molecular weight | Tertiary amino group equivalent (eq/kg) |
|---|---|---|---|
| Example 1-1 | Hydrophilic | 87,000 | 0.67 |
| Example 1-2 | Hydrophilic | 63,000 | 0.76 |
| Example 1-3 | Hydrophilic | 69,000 | 1.23 |
| Comparative Example 1-1 | Hydrophilic | 84,000 | not contained |
| Comparative Example 1-2 | Non-hydrophilic | 72,000 | not contained |
| Comparative Example 1-3 | Non-hydrophilic | 84,000 | 0.68 |

[Evaluation]

Each resin solution of Examples 1-1 to 1-3 and Comparative Examples 1-1 to 1-3 was used for each Example and each Comparative Example, and coated on release paper, then the coated release paper was heated 110° C. for 1 minute and the solvent was dried to form each transparent resin film having a thickness of about 20 μm. The effect on the elimination of an iodine ion was evaluated by the following method using each transparent resin film of Examples 1-1 to 1-3 and Comparative Examples 1-1 to 1-3 thus obtained. As an iodine solution used for the evaluation test, a solution prepared by dissolving potassium iodide in ion-exchanged pure water so that the iodine ion concentration became 100 mg/L (100 ppm) was used. In addition, when the iodine ion can be eliminated, radioactive iodine can be eliminated naturally.

Evaluation Results of Resin of Example 1-1

The elimination rate of an iodine ion was measured by immersing statically 10 g of the transparent resin film of Example 1-1 in 100 ml of the above iodine solution (25° C.) and measuring the concentration of the iodine ion in the solution every time a predetermined time was elapsed by an ion chromatography (IC2001; manufactured by Tosoh Corporation). The results were shown in Table 2 and FIG. 1.

TABLE 2

| Evaluation results in the case of using resin film of Example 1-1 | | |
|---|---|---|
| Immersion time (Hr) | Iodine ion concentration in liquid (ppm) | Elimination rate (%) |
| 0 | 100.0 | 0 |
| 1 | 65.9 | 34.1 |
| 5 | 38.2 | 61.8 |
| 15 | 23.8 | 76.2 |
| 24 | 18.5 | 81.5 |

Evaluation Results of Resin of Example 1-2

The elimination rate of an iodine ion was measured in the same manner as in the case where the resin film of Example 1-1 was used except that 10 g of the transparent film of Example 1-2 was used. The results were shown in Table 3 and FIG. 1.

TABLE 3

| Evaluation results in the case of using resin film of Example 1-2 | | |
|---|---|---|
| Immersion time (Hr) | Iodine ion concentration in liquid (ppm) | Elimination rate (%) |
| 0 | 100.0 | 0 |
| 1 | 61.5 | 38.5 |
| 5 | 27.3 | 72.7 |
| 15 | 18.7 | 81.3 |
| 24 | 12.1 | 87.9 |

Evaluation Results of Resin of Example 1-3

The elimination rate of an iodine ion was measured in the same manner as in the case where the resin film of Example 1-1 was used except that 10 g of the transparent film of Example 1-3 was used. The results were shown in Table 4 and FIG. 1.

TABLE 4

| Evaluation results in the case of using resin film of Example 1-3 | | |
|---|---|---|
| Immersion time (Hr) | Iodine ion concentration in liquid (ppm) | Elimination rate (%) |
| 0 | 100.0 | 0 |
| 1 | 52.8 | 47.2 |
| 5 | 21.2 | 78.8 |
| 15 | 11.5 | 88.5 |
| 24 | 7.5 | 92.5 |

Evaluation Results of Resin of Comparative Example 1-1

The elimination rate of an iodine ion was measured in the same manner as in the case where the resin film of Example 1-1 was used except that 10 g of the transparent film of Comparative Example 1-1 was used. The results were shown in Table 5 and FIG. 2.

TABLE 5

| Evaluation results in the case of using resin film of Comparative Example 1-1 | | |
|---|---|---|
| Immersion time (Hr) | Iodine ion concentration in liquid (ppm) | Elimination rate (%) |
| 0 | 100.0 | 0 |
| 1 | 95.2 | 4.8 |
| 5 | 88.5 | 11.5 |
| 15 | 87.3 | 12.7 |
| 24 | 86.5 | 13.5 |

Evaluation Results of Resin of Comparative Example 1-2

The elimination rate of an iodine ion was measured in the same manner as in the case where the resin film of Example 1-1 was used except that 10 g of the transparent film of Comparative Example 1-2 was used. The results were shown in Table 6 and FIG. 2.

TABLE 6

| Evaluation results in the case of using resin film of Comparative Example 1-2 | | |
|---|---|---|
| Immersion time (Hr) | Iodine ion concentration in liquid (ppm) | Elimination rate (%) |
| 0 | 100.0 | 0 |
| 1 | 98.2 | 1.8 |
| 5 | 98.5 | 1.5 |
| 15 | 97.6 | 2.4 |
| 24 | 97.1 | 2.9 |

Evaluation Results of Resin of Comparative Example 1-3

The elimination rate of an iodine ion was measured in the same manner as in the case where the resin film of Example 1-1 was used except that 10 g of the transparent film of Comparative Example 1-3 was used. The results were shown in Table 7 and FIG. 2.

TABLE 7

| Evaluation results in the case of using resin film of Comparative Example 1-3 | | |
|---|---|---|
| Immersion time (Hr) | Iodine ion concentration in liquid (ppm) | Elimination rate (%) |
| 0 | 100.0 | 0 |
| 1 | 97.7 | 2.3 |
| 5 | 95.1 | 4.9 |
| 15 | 93.3 | 6.7 |
| 24 | 92.4 | 7.6 |

As shown in FIGS. 1 and 2 and Tables 2 to 7, in the comparison of the hydrophilic resins of Examples comprising the aforementioned first hydrophilic resin with the resins of Comparative Examples, it was confirmed that all the hydrophilic resins of Examples exhibited high fixing properties to an iodine ion and the iodine ion was not discharged after a long period of time was elapsed.

(Second Present Invention)

Next, the second present invention will be explained in detail giving Examples and Comparative Examples.

[Example 2-1] (Synthesis of Hydrophilic Polyurethane Resin Having Tertiary Amino Group and Polysiloxane Segment)

A reaction vessel equipped with a stirrer, a thermometer, a gas introducing tube, and a reflux cooler was purged with nitrogen, and then in the reaction vessel, 8 parts of a polydimethylsiloxanepolyol having the following structure (molecular weight 3,200), 142 parts of a polyethylene glycol (molecular weight 2,040), 20 parts of N-methyldiethanolamine, and 5 parts of diethylene glycol were dissolved in a mixed solvent of 100 parts of methyl ethyl ketone and 200 parts of dimethylformamide. Then, while the resultant mixture was stirred well at 60° C., a solution in which 73 parts of hydrogenated MDI was dissolved in 100 parts of methyl ethyl ketone was slowly dropped in the mixture. After the completion of the dropping, the resultant mixture was subjected to reaction at 80° C. for 6 hours, and thereafter 60 parts of methyl ethyl ketone was added to the reaction mixture to obtain a hydrophilic resin solution of the present Example comprising the second hydrophilic resin having a structure specified in the present invention.

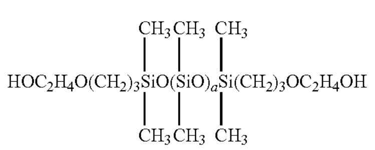

(a is an integer that gives a molecular weight of 3,200)

The resin solution obtained as described above had a solid content of 35% and a viscosity of 330 dPa·s (25° C.) Moreover, a hydrophilic resin film of the present Example formed from the solution had a breaking strength of 20.5 MPa, a breaking elongation of 400%, and a thermal softening temperature of 103° C.

[Example 2-2] (Synthesis of Hydrophilic Polyurethane Resin Having Tertiary Amino Group and Polysiloxane Segment)

In a reaction vessel similar to the one used in Example 2-1, 5 parts of a polydimethylsiloxanediamine having the following structure (molecular weight 3,880), 145 parts of a polyethylene oxide diamine ("JEFFAMINE ED" (trade name) manufactured by Huntsman Corporation; molecular weight 2,000), 25 parts of methyliminobispropylamine, and 5 parts of 1,4-diaminobutane were dissolved in 250 parts of dimethylformamide, and the resultant mixture was stirred well at an internal temperature of 20 to 30° C. Then a solution in which 75 parts of hydrogenated MDI was dissolved in 100 parts of dimethylformamide was slowly dropped in the mixture under stirring. After the completion of the dropping, the internal temperature was gradually raised, and when the temperature reached 50° C., the resultant mixture was subjected to reaction for further 6 hours, and thereafter 124 parts of dimethylformamide was added to the reaction mixture to obtain a hydrophilic resin solution of the present Example comprising the aforementioned second hydrophilic resin.

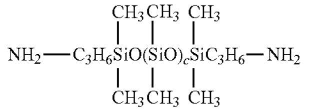

(c is an integer that gives a molecular weight of 3,880)

The resin solution obtained as described above had a solid content of 35% and a viscosity of 315 dPa·s (25° C.). Moreover, a hydrophilic resin film of the present Example formed from the solution had a breaking strength of 31.3 MPa, a breaking elongation of 370%, and a thermal softening temperature of 147° C.

[Example 2-3] (Synthesis of Hydrophilic Polyurethane-Polyurea Resin Having Tertiary Amino Group and Polysiloxane Segment)

In a reaction vessel similar to the one used in Example 2-1, 5 parts of an ethylene oxide added type polydimethylsiloxane having the following structure (molecular weight 4,500), 145 parts of a polyethylene oxide diamine ("JEFFAMINE ED" (trade name) manufactured by Huntsman Corporation; molecular weight 2,000), 30 parts of N,N-dimethyl-N',N'-dihydroxyethyl-1,3-diaminopropane, and 5 parts of 1,4-diaminobutane were dissolved in a mixed solvent of 150 parts of methyl ethyl ketone and 150 parts of dimethylformamide, and the resultant mixture was stirred well at an internal temperature of 20 to 30° C. Then a solution in which 72 parts of hydrogenated MDI was dissolved in 100 parts of methyl ethyl ketone was slowly dropped in the mixture under stirring. After the completion of the dropping, the resultant mixture was subjected to reaction at 80° C. for 6 hours, and after the completion of the reaction, 75 parts of methyl ethyl ketone was added to the reaction mixture to obtain a resin solution of the present Example comprising the above-described second hydrophilic resin.

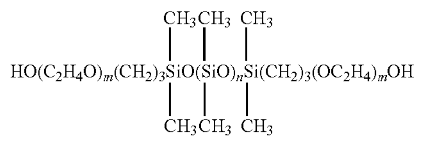

(m and n are integers that give a molecular weight of 4,500)

The resin solution obtained as described above had a solid content of 35% and a viscosity of 390 dPa·s (25° C.).

Moreover, a hydrophilic resin film formed from the solution had a breaking strength of 22.7 MPa, a breaking elongation of 450%, and a thermal softening temperature of 127° C.

[Comparative Example 2-1] (Synthesis of Hydrophilic Polyurethane Resin Having Neither Tertiary Amino Group Nor Polysiloxane Segment)

A solution of a polyurethane resin was obtained by using the same ingredients and formulation as in Example 2-1 except that the polydimethylsiloxanepolyol and N-methyldiethanolamine were not used. The resin solution of the present Comparative Example had a solid content of 35% and a viscosity of 500 dPa·s (25° C.). Moreover, a resin film formed from the solution had a breaking strength of 21.5 MPa, a breaking elongation of 400%, and a thermal softening temperature of 102° C.

[Comparative Example 2-2] (Synthesis of Non-Hydrophilic Polyurethane Resin Having Neither Tertiary Amino Group Nor Polysiloxane Segment)

A reaction vessel similar to the one used in Example 2-1 was purged with nitrogen, 150 parts of a polybutylene adipate having an average molecular weight of about 2,000 and 15 parts of 1,4-butanediol were dissolved in 250 parts of dimethylformamide, and the resultant mixture was stirred well at 60° C. Then a solution in which 62 parts of hydrogenated MDI was dissolved in 171 parts of dimethylformamide was slowly dropped in the mixture under stirring. After the completion of the dropping, the mixture was subjected to reaction at 80° C. for 6 hours to obtain a resin solution of the present Comparative Example. The resin solution had a solid content of 35% and a viscosity of 3.2 MPa·s (25° C.). Moreover, a resin film formed from the solution had a breaking strength of 45 MPa, a breaking elongation of 480%, and a thermal softening temperature of 110° C.

[Comparative Example 2-3] (Synthesis of Non-Hydrophilic Polyurethane Resin Having Tertiary Amino Group but not Having Polysiloxane Segment)

A reaction vessel was purged with nitrogen in the same manner as in Example 2-1, 150 parts of a polybutylene adipate having an average molecular weight of about 2,000, 20 parts of N-methyldiethanolamine, and 5 parts of diethylene glycol were dissolved in a mixed solvent of 200 parts of methyl ethyl ketone and 150 parts of dimethylformamide, and the resultant mixture was stirred well at 60° C. Then a solution in which 74 parts of hydrogenated MDI was dissolved in 112 parts of methyl ethyl ketone was slowly dropped in the mixture under stirring. After the completion of the dropping, the resultant mixture was subjected to reaction at 80° C. for 6 hours, and thereby a resin solution of the present Comparative Example was obtained. The resin solution had a solid content of 35% and a viscosity of 510 dPa·s (25° C.). Moreover, a film formed from the solution had a breaking strength of 23.5 MPa, a breaking elongation of 470%, and a thermal softening temperature of 110° C.

The weight average molecular weight and the content of the tertiary amino group and the polysiloxane segment of each resin in Examples 2-1 to 2-3 and Comparative Examples 2-1 to 2-3 obtained as described above were as shown in Table 8.

TABLE 8

Properties of respective resins of Examples and Comparative Examples

| | Hydrophilic/ Non-hydrophilic | Weight average molecular weight | Tertiary amino group equivalent (eq/kg) | Content of poly-siloxane segment (%) |
|---|---|---|---|---|
| Example 2-1 | Hydrophilic | 75,000 | 0.66 | 3.2 |
| Example 2-2 | Hydrophilic | 71,000 | 0.75 | 2.0 |
| Example 2-3 | Hydrophilic | 77,000 | 1.22 | 1.2 |
| Comparative Example 2-1 | Hydrophilic | 84,000 | not contained | not contained |
| Comparative Example 2-2 | Non-hydrophilic | 72,000 | not contained | not contained |
| Comparative Example 2-3 | Non-hydrophilic | 84,000 | 0.68 | not contained |

[Evaluation]

Each resin solution of Examples 2-1 to 2-3 and Comparative Examples 2-1 to 2-3 was used for each Example and each Comparative Example, coated on release paper, then the coated release paper was heated 120° C. for 1 minute and the solvent was dried to form each transparent film having a thickness of about 20 μm. Tests were conducted in terms of the following items using each transparent resin film of Examples 2-1 to 2-3 and Comparative Examples 2-1 to 2-3 thus obtained and the results were evaluated respectively.

<Blocking Resistance (Sticking Resistance)>

Film faces of each resin film of Examples 2-1 to 2-3 and Comparative Examples 2-1 to 2-3 were placed face to face, and the films were left at 40° C. for 1 day while a load of 0.29 MPa was applied thereon. Thereafter, the blocking resistance of the films with the faces placed face to face was visually observed and evaluated according to the following criteria. The results were shown in Table 9.

Good: No blocking was observed.

Fair: Slight blocking was observed.

Poor: Blocking was observed.

<Water Resistance>

Each film of Examples 2-1 to 2-3 and Comparative Examples 2-1 to 2-3 was cut in a shape having a thickness of 20 μm, a longitudinal length of 5 cm, and a transversal length of 1 cm and immersed in water having a temperature of 25° C. for 12 hours, the longitudinal length of the immersed film after the immersion test was measured, and the coefficient of expansion in the longitudinal direction (%) of the immersed film was calculated using the following formula. And a film having a coefficient of expansion of less than 200% was evaluated as "Good" and a film having a coefficient of expansion of 200% or more was evaluated as "Poor". The results were shown in Table 9.

Coefficient of expansion (%)=(Length after test/Length before test)×100

TABLE 9

Evaluation results (Blocking resistance and Water resistance)

| | Blocking Resistance | Water resistance [Coefficient of expansion (%)] |
|---|---|---|
| Example 2-1 | Good | Good [138] |
| Example 2-2 | Good | Good [147] |
| Example 2-3 | Good | Good [164] |
| Comparative Example 2-1 | Poor | Poor [287] |

TABLE 9-continued

| Evaluation results (Blocking resistance and Water resistance) | | |
|---|---|---|
| | Blocking Resistance | Water resistance [Coefficient of expansion (%)] |
| Comparative Example 2-2 | Poor | Good [106] |
| Comparative Example 2-3 | Fair | Good [104] |

<Effect on Elimination of Iodine Ion>

The effect on elimination of an iodine ion was evaluated by the following method using each transparent resin film of Examples 2-1 to 2-3 and Comparative Examples 2-1 to 2-3.

(Preparation of Iodine Solution for Test)

As an iodine solution used for the evaluation test, a solution prepared by dissolving potassium iodide in ion-exchanged pure water so that the iodine ion concentration became 100 mg/L (100 ppm) was used. In addition, when the iodine ion can be eliminated, radioactive iodine can be eliminated naturally.

Evaluation Results of Resin of Example 2-1

In 100 ml of the above iodine solution (25° C.), 10 g of the resin film of Example 2-1 was immersed statically for 24 hours, and the concentration of an iodine ion in the solution was measured every time a predetermined time was elapsed by an ion chromatography (IC2001; manufactured by Tosoh Corporation). And the elimination rate of the iodine ion was determined. The results were shown in Table 10 and FIG. 3.

TABLE 10

| Evaluation results in the case of using resin film of Example 2-1 | | |
|---|---|---|
| Immersion time (Hr) | Iodine ion concentration in liquid (ppm) | Elimination rate (%) |
| 0 | 100.0 | 0 |
| 1 | 70.5 | 29.5 |
| 5 | 45.3 | 54.7 |
| 15 | 31.8 | 68.2 |
| 24 | 27.5 | 72.5 |

Evaluation Results of Resin of Example 2-2

The concentration of an iodine ion in a solution was measured in the same manner as in the case where the resin film of Example 2-1 was used except that 10 g of the resin film of Example 2-2 was used, and the elimination rate of the iodine ion was determined. The results were shown in Table 11 and FIG. 3.

TABLE 11

| Evaluation results in the case of using resin film of Example 2-2 | | |
|---|---|---|
| Immersion time (Hr) | Iodine ion concentration in liquid (ppm) | Elimination rate (%) |
| 0 | 100.0 | 0 |
| 1 | 67.1 | 32.9 |
| 5 | 40.8 | 59.2 |

TABLE 11-continued

| Evaluation results in the case of using resin film of Example 2-2 | | |
|---|---|---|
| Immersion time (Hr) | Iodine ion concentration in liquid (ppm) | Elimination rate (%) |
| 15 | 25.7 | 74.3 |
| 24 | 19.3 | 80.7 |

Evaluation Results of Resin of Example 2-3

The concentration of an iodine ion in a solution was measured in the same manner as in the case where the resin film of Example 2-1 was used except that 10 g of the resin film of Example 2-3 was used, and the elimination rate of the iodine ion was determined. The results were shown in Table 12 and FIG. 3.

TABLE 12

| Evaluation results in the case of using resin film of Example 2-3 | | |
|---|---|---|
| Immersion time (Hr) | Iodine ion concentration in liquid (ppm) | Elimination rate (%) |
| 0 | 100.0 | 0 |
| 1 | 60.3 | 39.7 |
| 5 | 29.5 | 70.5 |
| 15 | 17.2 | 82.8 |
| 24 | 13.8 | 86.2 |

Evaluation Results of Resin of Comparative Example 2-1

The concentration of an iodine ion in a solution was measured in the same manner as in the case where the test was conducted using the resin film of Example 2-1 except that 10 g of the resin film of Comparative Example 2-1 was used, and the elimination rate of the iodine ion was determined. The results were shown in Table 13 and FIG. 4.

TABLE 13

| Evaluation results in the case of using resin film in Comparative Example 2-1 | | |
|---|---|---|
| Immersion time (Hr) | Iodine ion concentration in liquid (ppm) | Elimination rate (%) |
| 0 | 100.0 | 0 |
| 1 | 95.2 | 4.8 |
| 5 | 88.5 | 11.5 |
| 15 | 87.3 | 12.7 |
| 24 | 86.5 | 13.5 |

Evaluation Results of Resin in Comparative Example 2-2

The concentration of an iodine ion in a solution was measured in the same manner as in the case where the test was conducted using the resin film of Example 2-1 except that 10 g of the resin film of Comparative Example 2-2 was used, and the elimination rate of the iodine ion was determined. The results were shown in Table 14 and FIG. 4.

TABLE 14

| Evaluation results in the case of using resin film of Comparative Example 2-2 | | |
|---|---|---|
| Immersion time (Hr) | Iodine ion concentration in liquid (ppm) | Elimination rate (%) |
| 0 | 100.0 | 0 |
| 1 | 98.2 | 1.8 |
| 5 | 98.5 | 1.5 |
| 15 | 97.6 | 2.4 |
| 24 | 97.1 | 2.9 |

Evaluation Results of Resin of Comparative Example 2-3

The concentration of an iodine ion in a solution was measured in the same manner as in the case where the test was conducted using the resin film of Example 2-1 except that 10 g of the resin film of Comparative Example 2-3 was used, and the elimination rate of the iodine ion was determined. The results were shown in Table 15 and FIG. 4.

TABLE 15

| Evaluation results in the case of using resin film of Comparative Example 2-3 | | |
|---|---|---|
| Immersion time (Hr) | Iodine ion concentration in liquid (ppm) | Elimination rate (%) |
| 0 | 100.0 | 0 |
| 1 | 97.7 | 2.3 |
| 5 | 95.1 | 4.9 |
| 15 | 93.3 | 6.7 |
| 24 | 92.4 | 7.6 |

INDUSTRIAL APPLICABILITY

As an application example of the first and the second present invention, a method for eliminating radioactive iodine in radioactive waste liquid or a radioactive solid body is provided by means of a novel method for eliminating radioactive iodine that is simple and low-cost and furthermore does not require an energy source such as electricity. Furthermore, according to the first present invention, the eliminated radioactive iodine can be taken in and stably immobilized within the hydrophilic resin having a particular structure. Moreover, according to the second present invention, by introducing, in addition to a tertiary amino group that ionically bonds with radioactive iodine, a polysiloxane segment in the structure of the hydrophilic resin having a hydrophilic segment, an excellent hydrophilic resin that is more useful for the elimination processing of radioactive iodine in which process achieving both of the water resistance and the blocking resistance (sticking resistance) brought about by the existence of the polysiloxane segment are realized can be provided, and therefore the eliminated radioactive iodine can be taken in and immobilized stably. Since the material that is used for the elimination method of the first and the second present invention and immobilizes radioactive iodine is a resin, reduction in the volume of radioactive waste can be achieved as necessary, thus the problem of the radioactive waste generated after the elimination processing can be reduced, and from this point of view, the utilization of the first and the second present invention can be expected.

The invention claimed is:

1. A method for eliminating radioactive iodine using a hydrophilic resin that adsorbs radioactive iodine in liquid and/or a solid body, comprising the steps of:

providing a hydrophilic resin selected from the group consisting of a hydrophilic polyurethane resin, a hydrophilic polyurea resin, and a hydrophilic polyurethane-polyurea resin, wherein the hydrophilic resin has a hydrophilic segment, wherein a structure of the hydrophilic resin has a principal chain and a side chain, and wherein a tertiary amino group-containing segment is located in said principal chain and/or said side chain; and contacting the liquid and/or solid body with the hydrophilic resin to adsorb radioactive iodine from the liquid and/or solid body within the hydrophilic resin.

2. The method for eliminating radioactive iodine according to claim 1, wherein the hydrophilic segment is a polyethylene oxide segment.

3. The method for eliminating radioactive iodine according to claim 2, wherein the hydrophilic resin is a resin formed from, as a part of a raw material, a polyol having at least one tertiary amino group or a polyamine having at least one tertiary amino group.

4. The method for eliminating radioactive iodine according to claim 1, wherein the hydrophilic resin is a resin formed from, as a part of a raw material, a polyol having at least one tertiary amino group or a polyamine having at least one tertiary amino group.

5. The method for eliminating radioactive iodine according to claim 1, wherein a polysiloxane segment is located in said principal chain and/or said side chain.

6. The method for eliminating radioactive iodine according to claim 5, wherein the hydrophilic segment is a polyethylene oxide segment.

7. The method for eliminating radioactive iodine according to claim 6, wherein the hydrophilic resin is a resin formed from, as a part of a raw material, a polyol having at least one tertiary amino group or a polyamine having at least one tertiary amino group and a compound having at least one active hydrogen containing-group and a polysiloxane segment in the same molecule.

8. The method for eliminating radioactive iodine according to claim 5, wherein the hydrophilic resin is a resin formed from, as a part of a raw material, a polyol having at least one tertiary amino group or a polyamine having at least one tertiary amino group and a compound having at least one active hydrogen containing-group and a polysiloxane segment in the same molecule.

9. The method for eliminating radioactive iodine according to claim 5, wherein the hydrophilic segment, the tertiary amino group-containing segment that contains a component having at least one tertiary amino group as a constituent unit and the polysiloxane segment are randomly connected through a urethane bond, a urea bond or a urethane-urea bond.

10. The method for eliminating radioactive iodine according to claim 1, wherein the hydrophilic segment and the tertiary amino group-containing segment that contains a component having at least one tertiary amino group as a constituent unit are randomly connected through a urethane bond, a urea bond or a urethane-urea bond.

* * * * *